United States Patent
Jang

(10) Patent No.: US 8,204,547 B2
(45) Date of Patent: Jun. 19, 2012

(54) MOBILE TERMINAL AND METHOD OF CONTROLLING THE MOBILE TERMINAL

(75) Inventor: Sung Bong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 12/576,175

(22) Filed: Oct. 8, 2009

(65) Prior Publication Data

US 2010/0130257 A1 May 27, 2010

(30) Foreign Application Priority Data

Nov. 26, 2008 (KR) .................. 10-2008-0118327

(51) Int. Cl.
*G06F 15/16* (2006.01)

(52) U.S. Cl. ...................... 455/566; 455/41.2

(58) Field of Classification Search ............... 345/173, 345/407.1, 407.2, 440.1; 455/41.2, 566
See application file for complete search history.

(56) References Cited

U.S. PATENT DOCUMENTS

2009/0298545 A1* 12/2009 Kittel et al. ................ 455/566
2010/0053169 A1* 3/2010 Cook ...................... 345/440.1
* cited by examiner

*Primary Examiner* — Sam Bhattacharya
(74) *Attorney, Agent, or Firm* — Lee, Hong, Degerman, Kang & Waimey

(57) ABSTRACT

Provided are a mobile terminal and a method of controlling the mobile terminal, in which the emotions or feelings of the user of one mobile terminal can be carried to the user of another mobile terminal by varying the font size of handwritten input transmitted between the mobile terminals and/or applying a haptic effect to the handwritten input according to the level of pressure applied to a touch screen for generating the handwritten input.

17 Claims, 9 Drawing Sheets

MOBILE TERMINAL AND METHOD OF CONTROLLING THE MOBILE TERMINAL

CROSS-REFERENCE TO RELATED APPLICATION

This application claims the priority benefit of Korean Patent Application No. 10-2008-0118327, filed on Nov. 26, 2008 in the Korean Intellectual Property Office, the disclosure of which is incorporated herein by reference.

BACKGROUND OF THE INVENTION

1. Field of the Invention

The present invention relates to a mobile terminal and a method of controlling the mobile terminal, in which handwritten input whose font size can vary according to the level of pressure applied to a touch screen can be transmitted or received during a video call or in association with a text message.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Even though mobile terminals have evolved into multimedia devices capable of providing various multimedia-related functions, various game-related functions and a broadcast reception function, a voice call function and a text message transmission/reception function are still deemed the ultimate functions of mobile terminals.

The text message transmission/reception function has been developed in consideration of a typical key arrangement for inputting characters to mobile terminals. As a result, there is a clear limit in displaying text messages transmitted between mobile terminals in various fonts and font sizes.

Even though there are various touch input-based text message transmission/reception techniques currently available, they simply aim at transmitting or receiving images created in response to touch input.

Therefore, it is difficult to carry the emotions or feelings of the user of one mobile terminal to the user of another mobile terminal simply by sending text messages using a few default fonts or sending images created in response to touch input.

SUMMARY OF THE INVENTION

The present invention provides a mobile terminal and a method of controlling the mobile terminal, in which handwritten input whose font size can vary according to the level of pressure applied to a touch screen can be transmitted along with a haptic effect in order to carry the emotions or feelings of the user of the mobile terminal to the user of another mobile terminal.

According to an aspect of the present invention, there is provided a method of controlling a mobile terminal, the method including receiving a packet including handwritten input and pressure information regarding the handwritten input; displaying the handwritten input on a display module; and generating a haptic effect corresponding to the pressure information while continuously displaying the handwritten input on the display module.

According to another aspect of the present invention, there is provided a method of controlling a mobile terminal, the method including receiving a packet including handwritten input, input time information specifying an amount of time taken to generate the handwritten input, and impact information specifying the time of application of a highest pressure level during the generation of the handwritten input; displaying the handwritten input according to the input time information; and generating a haptic effect according to the impact information.

According to another aspect of the present invention, there is provided a method of controlling a mobile terminal, the method including generating handwritten input by handwriting a number of characters on a touch screen; generating a packet based on the handwritten input and pressure information specifying a level of pressure applied to the touch screen for generating the handwritten input; and encoding the packet and transmitting the encoded packet to a receiving mobile terminal.

According to another aspect of the present invention, there is provided a mobile terminal including a wireless communication unit configured to provide an interface for communication with a receiving mobile terminal; a touch screen configured to recognize pressure applied thereto for generating handwritten input and recognize the handwritten input; and a controller configured to generate a first packet including the handwritten input and the pressure information specifying a level of pressure applied to the touch screen for generating the handwritten input and transmit the first packet to the receiving mobile terminal via the wireless communication unit.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
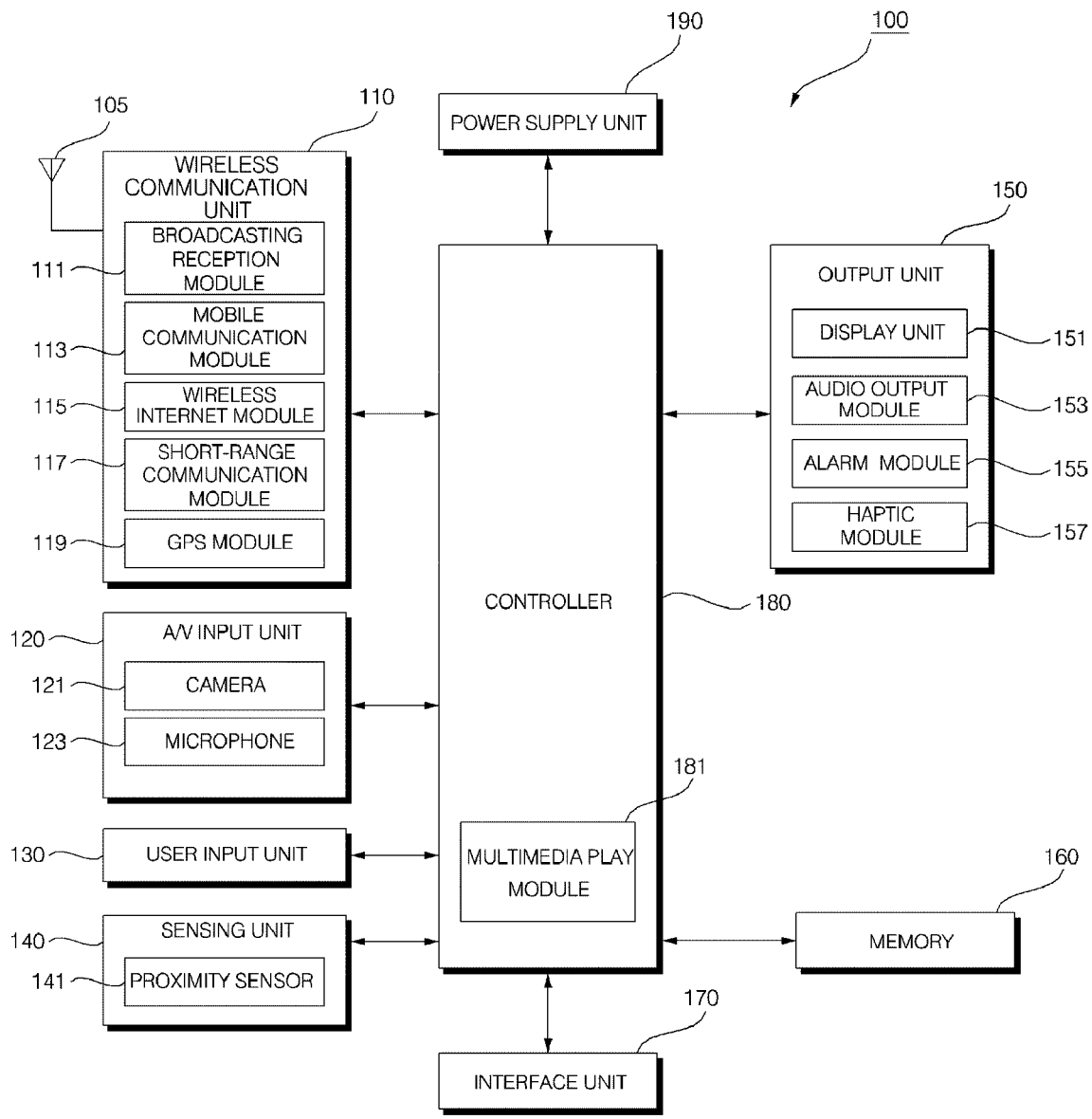
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

In this disclosure, the display module 151 is sometimes referred to as the touch screen 151 especially when used to display various information in response to touch input.

The user input unit 130 may allow the user to handwrite on the display module 151. More specifically, the user may apply pressure onto the display module 151 using his or her finger or a stylus pen and may thus handwrite on the display module 151.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The output unit 150 may output audio signals, video signals and alarm signals. The output unit 150 may include the display module 151, and an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel may be a transparent panel attached onto the exterior of the mobile terminal 100 and may be connected to an internal bus of the mobile terminal 100. The touch screen panel may keep monitoring whether the touch screen panel is being touched by the user. Once there is touch input detected from the touch screen panel, the touch screen panel may transmit a number of signals corresponding to the detected touch input to the touch screen panel controller. The touch screen panel controller may process the signals transmitted by the touch screen panel, and may transmit the processed signals to the controller 180. Then, the controller 180 may determine whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, a three-dimensional (3D) display and a transparent display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may generate vibration upon receiving a call signal or a message. In addition, the alarm module 155 may receive a key signal and may generate vibration as feedback to the key signal. Therefore, the user may be able to easily recognize the occurrence of an event based on vibration generated by the alarm module 155. An alarm signal for notifying the user of the occurrence of an event may be output not only by the alarm module 155 but also by the display module 151 or the audio output module 153.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The controller 180 may receive a video signal and/or an audio signal from the A/V input unit 120, and may allow the user to engage in a voice call with the user of another mobile terminal based on the received video signal and/or the received audio signal.

During a video call, the voice and an image of the user of the mobile terminal 100 may be captured by the camera 121 and the microphone 123, and the captured voice and image may be transmitted to another mobile terminal. As a result, a user of the other mobile terminal can engage in a voice call with the user of the mobile terminal 100 while watching the image of the user of the mobile terminal 100.

The controller 180 may process handwritten input on the touch screen 151 according to the level of pressure applied to the touch screen 151 for generating the handwritten input. In addition, the controller 180 may generate pressure information based on the level of pressure applied to the touch screen 151 for generating the handwritten input, and mix the handwritten input and the pressure information with a video signal and an audio signal. For this, the controller 180 may be equipped with an H.324M codec, but the present invention is not restricted to this. That is, the controller 180 may be equipped with any type of protocol (regardless of whether hardware or software) capable of mixing the handwritten input, the pressure information, a video signal and an audio signal. In short, the mobile terminal 100 may encode the handwritten input, the pressure information, a video signal and an audio signal into a single packet, and may thus allow the user of the mobile terminal 100 to transmit or receive a text message while engaging in a video call. The packet may be a packet for performing a video call, a multimedia message service (MMS) packet or a short message service (SMS) packet. The font size of the handwritten input may be determined by the pressure information. More specifically, a receiving mobile terminal receiving the handwritten input from the mobile terminal 100 may determine the font size of the handwritten input based on the pressure information provided by the mobile terminal 100.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a bar-type mobile terminal equipped with a full-touch screen. However, the present invention is not restricted to a bar-type mobile terminal. Rather, the present invention can be applied to various mobile phones, other than a bar-type mobile terminal.

Figure 2:
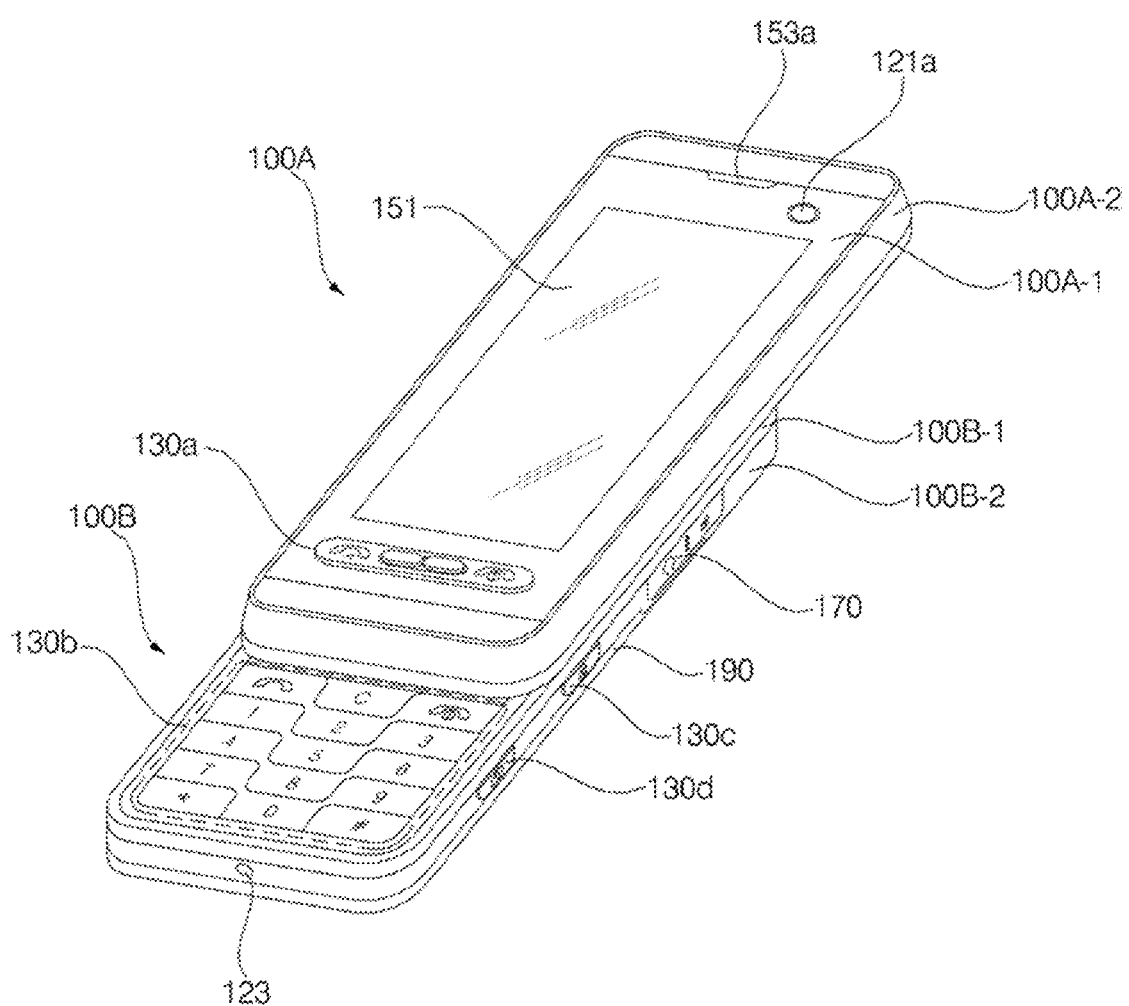
FIG. 2 illustrates a front perspective view of the mobile terminal shown in FIG. 1.

FIG. 2 illustrates a front perspective view of an example of the mobile terminal 100 shown in FIG. 1. Referring to FIG. 2, the exterior of the first body 100A may be defined by a front case 100A-1 and a rear case 100A-2. Various electronic devices may be installed in the space formed by the front case 100A-1 and the rear case 100A-2. At least one intermediate case may be additionally provided between the front case 100A-1 and the rear case 100A-2. The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

The display module 151, a first audio output module 153a, a first camera 121a and a first user input unit 130a may be disposed in the front case 100A-1. A second audio output module (not shown) may also be disposed in the front case 100A-1. The second audio output module may provide a stereo function along with the first audio output module 153a, or may be used during a speakerphone mode.

An antenna for receiving a call and an antenna for receiving a broadcast signal may be disposed on one side of the front case 100A-1. The antennas may be installed so as to be able to be ejected from the front case 100A-1.

Second and third user input units 130b and 130c and the microphone 123 may be disposed on one side of the rear case 100A-2.

Examples of the display module 151 include an LCD and an OLED which can visualize information. Since a touch pad is configured to overlap the display module 151 and thus to form a layer structure, the display module 151 may serve as touch screens. Thus, it is possible for the user to input various information to the mobile terminal 100 simply by touching the display module 151.

The first audio output module 153a may be implemented as a receiver or a speaker. The first camera 121a may be configured to capture a still image or a moving image of the user. The microphone 123 may be configured to properly receive the user's voice or other sounds.

The first through third user input units 130a through 130c may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick.

The first user input unit 130a may allow the user to input commands (such as 'start', 'end', and 'send'), the second user input unit 130b may be used to switch from one operating mode to another, and the third user input unit 130c may be used as a hot key for activating certain functions of the mobile terminal 100.

Figure 3:
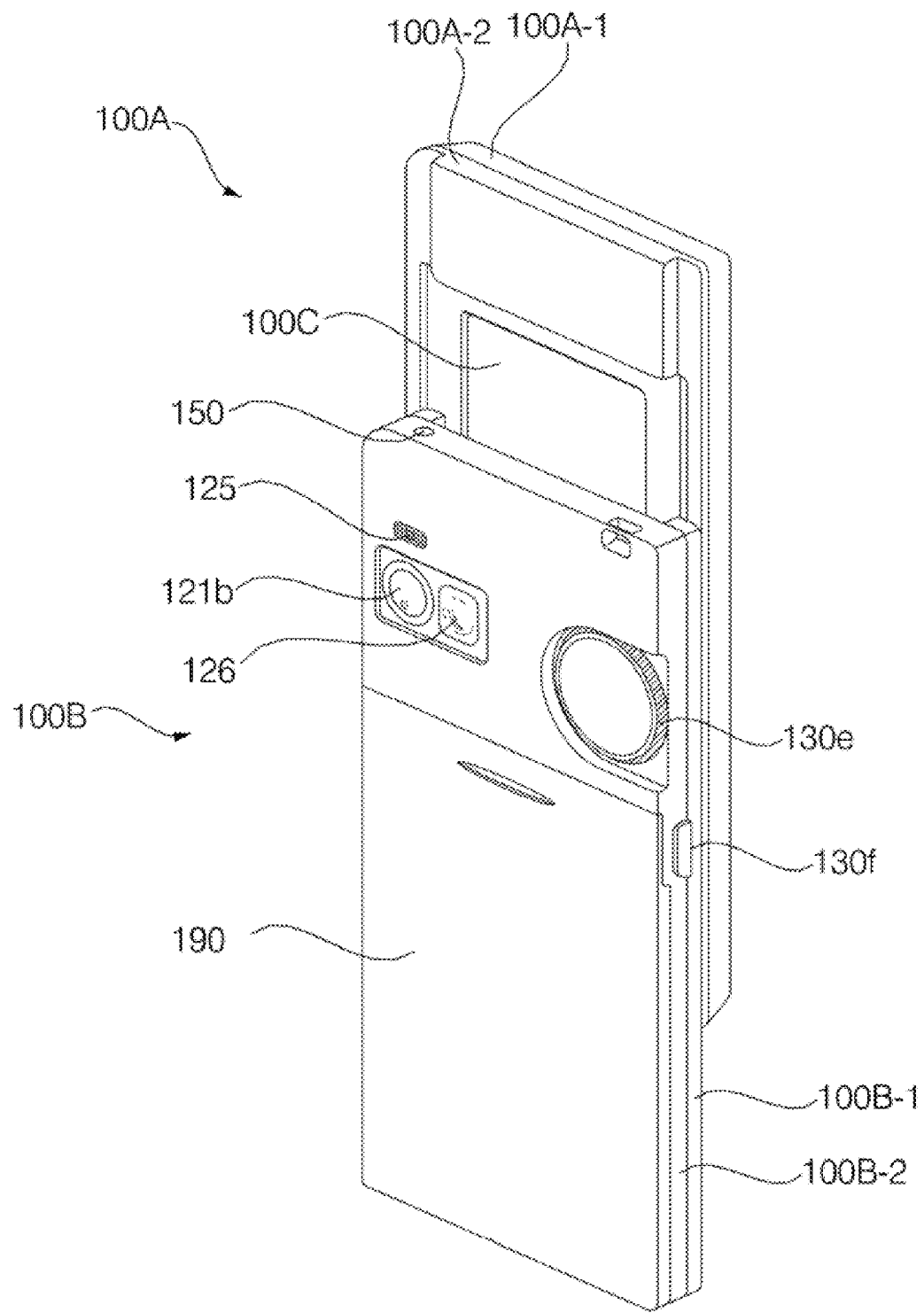
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fourth user input unit 130d, a fifth user input unit 130e and the interface unit 170 may be disposed on one side of the rear case 100A-2, and a second camera 121b may be disposed at the rear of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a camera flash 126 may be disposed near the second camera 121b. The mirror 125 may be used for the user to prepare himself or herself for taking a self shot. The cameral flash 126 may be used to illuminate a subject when the user attempts to capture an image of the subject with the second camera 121b.

The power supply unit 190 may be disposed in the rear case 100A-2. The power supply unit may be a rechargeable battery and may be coupled to the rear case 100A-2 so as to be attachable to or detachable from the rear case 100A-2.

The second camera 121b and the other elements that have been described as being provided on the rear case 100A-2 may be provided on the front case 100A-1.

In addition, the first camera 121a may be configured to be rotatable and thus to cover the photographing direction of the second camera 121b. In this case, the second camera 121b may be optional.

Figure 4:
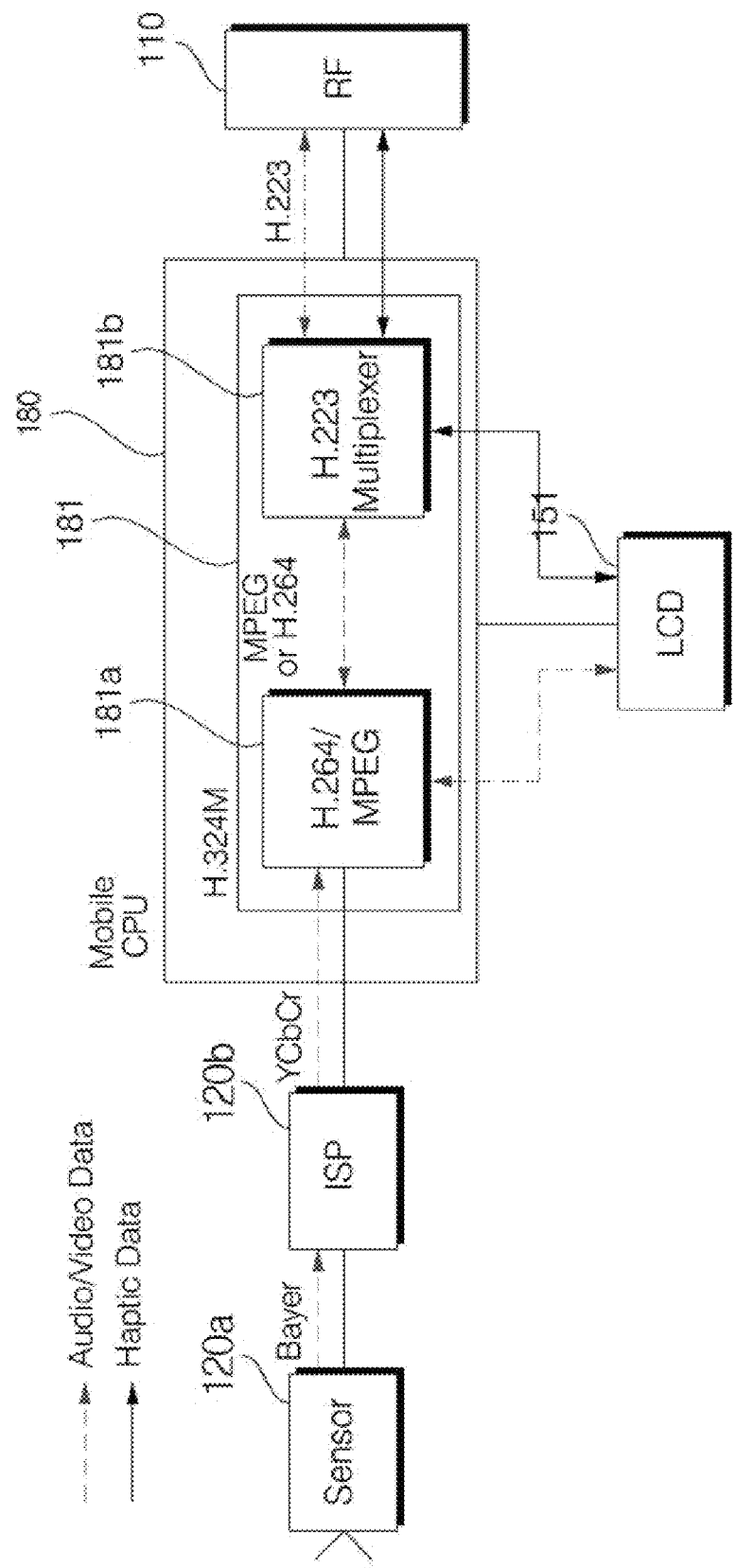
FIG. 4 illustrates a block diagram for explaining the flow of signals within the mobile terminal shown in FIG. 1 during a video call.

FIG. 4 illustrates a block diagram for explaining the flow of signals within the mobile terminal 100 during a video call. Referring to FIG. 4, during a video call, an image sensor 120a may capture an image of the background of the mobile terminal 100, and may convert the captured image into an electrical signal. The image sensor 120a may be a charge-coupled device (CCD) or a complementary metal-oxide semiconductor (CMOS). The electrical signal generated by the image sensor 120a, i.e., a video signal, may be provided to an image signal processor (ISP) 120b. The ISP 120b may convert the video signal to a predetermined video format, for example, YCbCr, and may provide a video signal obtained by the conversion to the controller 180.

The controller 180 may include an H.324M codec 181. The H.324M codec 181 may convert the video signal provided by the ISP 120b according to the H.324M protocol, which supports various A/V services. The controller 180 may obtain handwritten input and the level of pressure applied to the touch screen 151 for generating the handwritten input.

The H.324M codec 181 may include an H.264 codec 181a, which converts a YCbCr signal into a streaming transport packet, and an H.223 codec 181b. The H.223 codec 181b may mix the handwritten input and the pressure information with a video signal provided by the H.264 codec 181*a*, and may transmit a video signal obtained by the mixing to a receiving mobile terminal via the wireless communication terminal 110.

Figure 5:
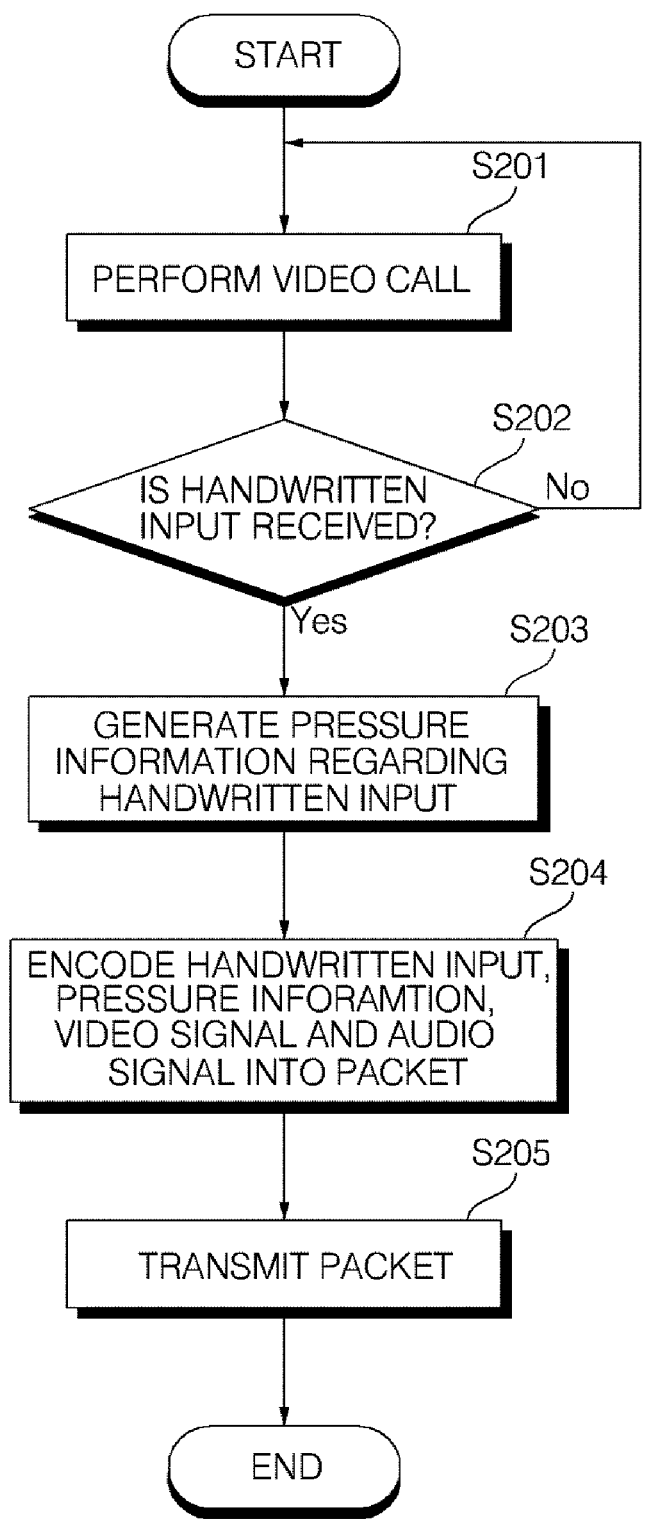
FIG. 5 illustrates a flowchart of a method of controlling a mobile terminal according to an exemplary embodiment of the present invention.

FIG. 5 illustrates a flowchart of a method of controlling a mobile terminal according to an exemplary embodiment of the present invention. In this exemplary embodiment, the mobile terminal 100 is a transmitting mobile terminal. Referring to FIG. 5, if a request for the performing of a video call mode is received via the user input unit 130 or via a menu displayed on the touch screen 151, the controller 180 may receive a video signal and an audio signal from the ISP 120*b*, may convert the received video signal into a packet and may provide the packet to the wireless communication unit 110 so as to allow the user of the mobile terminal 100 to engage in a video call with the user of a receiving mobile terminal (S201).

Thereafter, the controller 180 may determine whether there is handwritten input on the touch screen 151 (S202). The user of the mobile terminal 100 may handwrite various characters on the touch screen 151 with his or her finger or a stylus pen. For this, a 'HANDWRITE' menu (not shown) may be provided on the touch screen 151. In this case, if pressure is applied onto the touch screen 151 when the 'HANDWRITE' menu is selected, the controller 180 may determine that there is handwritten input on the touch screen 151. Then, the controller 180 may determine the level of pressure applied to the touch screen 151 for generating the handwritten input, and may generate pressure information based on the results of the determination (S203). The pressure information may include the level of pressure applied for generating the handwritten input, and particularly, an average level of pressure applied for handwriting each character in the handwritten input.

More specifically, if the handwritten input includes, for example, a Korean syllable consisting of an initial consonant, a vowel and a final consonant, the controller 180 may set an average of the pressure levels respectively corresponding to the initial consonant, the vowel and the final consonant as pressure information. Alternatively, the controller 180 may set each of the pressure levels respectively corresponding to the initial consonant, the vowel and the final consonant as pressure information. In the latter case, the font sizes of the initial consonant, the vowel and the final consonant may be determined separately by their respective pressure information.

Thereafter, the H.324M codec 181 of the controller 180 may encode the detected handwritten input, the pressure information generated in operation S203 regarding each of the detected handwritten input, the received video signal and the received audio signal into a single packet (S204), and may transmit the packet to the receiving mobile terminal via the wireless communication unit 110 (S205).

Figure 6:
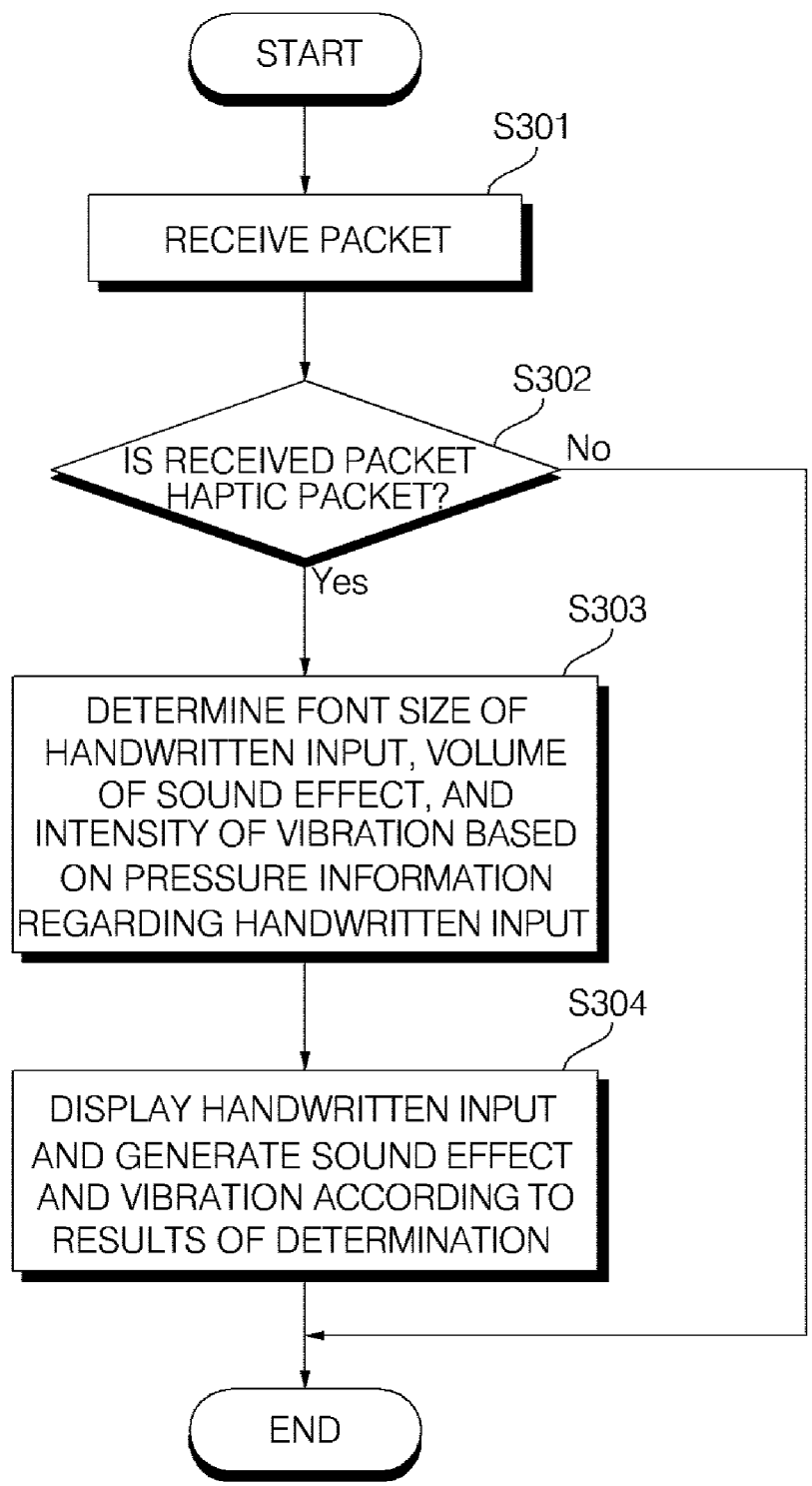
FIG. 6 illustrates a flowchart of a method of controlling a mobile terminal according to another exemplary embodiment of the present invention.

FIG. 6 illustrates a flowchart of a method of controlling a mobile terminal according to another exemplary embodiment of the present invention. In this exemplary embodiment, the mobile terminal 100 is a receiving terminal. Referring to FIG. 6, the controller 180 may receive a packet from a transmitting mobile terminal via the wireless communication unit 110 (S301), and may determine whether the received packet is a haptic packet into which handwritten input, pressure information regarding the handwritten input, and a video signal are encoded (S302). Haptic packets, unlike typical packets transmitted between mobile terminals, may include haptic information (i.e., pressure information regarding handwritten input). In order to differentiate haptic packets from other typical packets, a header field of each haptic packet may include a predetermined identifier. Pressure information regarding handwritten input may be included in a payload field of a haptic packet.

Thereafter, if the received packet is a haptic packet, the controller 180 may extract handwritten input and pressure information regarding the handwritten input from the received packet and may determine the font size of the handwritten input, the intensity of vibration and/or the volume of an alarm sound based on the pressure information (S303).

If the pressure information indicates a high pressure level, the controller 180 may display the handwritten input on the touch screen 151 in a large font size. On the other hand, if the pressure information indicates a low pressure level, the controller 180 may display the handwritten input on the touch screen 151 in a small font size. The controller 180 may output vibration or an alarm sound whose intensity or volume corresponds to the pressure level corresponding to the handwritten input when displaying the handwritten input on the touch screen 151.

Thereafter, the controller 180 may vary the font size of the handwritten input according to the pressure information (S304).

The received haptic packet may include a header field identifying packet type, a payload field including packet data, and a frame checksum field necessary for error correction.

The header field may have a value of "0XAF," which is the unique identifier of a haptic packet. The payload field may include the handwritten input and the pressure information. For example, if the handwritten input includes a plurality of Korean syllables, the plurality of Korean syllables and a plurality of pieces of pressure information respectively corresponding to the plurality of Korean syllables may be alternately arranged in the payload field. Each of the plurality of pieces of pressure information may be an average of the pressure levels respectively corresponding to an initial consonant, a vowel, and a final consonant of a corresponding Korean syllable.

More specifically, if the handwritten input includes a Korean syllable consisting of an initial consonant, a vowel, and a final consonant, each of the pressure levels respectively corresponding to the initial consonant, the vowel and the final consonant may be set as pressure information. For example, if the pressure levels respectively corresponding to the initial consonant, the vowel and the final consonant are 10, 2 and 5, the initial consonant may be displayed at a largest font size, the final consonant may be displayed at a smallest font size, and the vowel may be displayed at an intermediate font size between the largest font size and the smallest font size.

On the other hand, if the handwritten input includes a plurality of English characters, each of the pressure levels respectively corresponding to the plurality of English characters, instead of an average of the pressure levels respectively corresponding to the plurality of English characters, may be set as pressure information.

Figure 7:
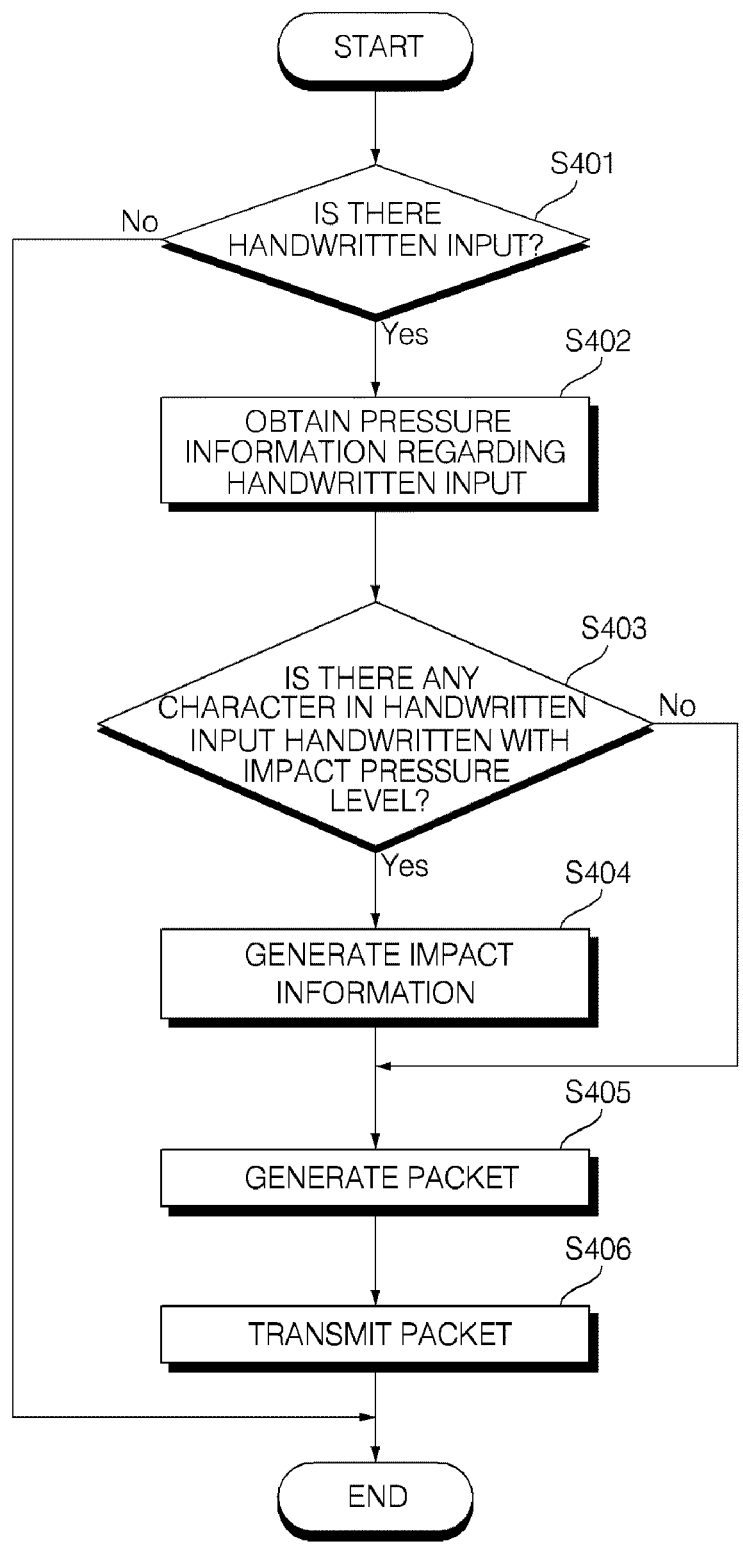
FIG. 7 illustrates a flowchart of a method of controlling a mobile terminal according to another exemplary embodiment of the present invention.

FIG. 7 illustrates a flowchart of a method of controlling a mobile terminal according to another exemplary embodiment of the present invention. In this exemplary embodiment, the mobile terminal 100 is a transmitting mobile terminal. Referring to FIG. 7, when a request for the performing of a voice call mode is issued via the user input unit 130 or via a menu displayed on the touch screen 151, the H.324M codec 181 of the controller 180 may receive a video signal and an audio signal from the ISP 120*b*, may convert the received video signal into a packet and may provide the packet to the wireless communication unit 110 so as to allow the user of the mobile terminal 100 to engage in a video call with the user of a receiving mobile terminal.

Thereafter, the controller 180 may determine whether there is handwritten input on the touch screen 151 (S401). The user of the mobile terminal 100 may handwrite various characters on the touch screen 151 with his or her finger or a stylus pen. For this, a 'HANDWRITE' menu (not shown) may be provided on the touch screen 151. In this case, if pressure is applied onto the touch screen 151 when the 'HANDWRITE' menu is selected, the controller 180 may determine that there is handwritten input on the touch screen 151. Then, the controller 180 may determine the level of pressure applied to the touch screen 151 for generating the handwritten input, and may generate pressure information based on the results of the determination (S402).

Thereafter, the controller 180 may determine whether the level of pressure applied to the touch screen 151 for handwriting each character in the handwritten input on the touch screen 151 or an average level of pressure for generating the whole handwritten input exceeds a predefined reference level and is thus classified as an impact pressure level (S403).

A character corresponding to a pressure level higher than the predefined reference level, i.e., an impact pressure level, may be deemed a character emphasized by the user of the mobile terminal 100. Thus, if there is a character in the handwritten input corresponding to an impact pressure level, the controller 180 may generate impact information indicating the existence of a character corresponding to an impact pressure level in the handwritten input and identifying the character corresponding to an impact pressure level (S404), may encode the handwritten input, the impact information, the received video signal and the received audio signal into a packet (S405), and may transmit the packet to the receiving mobile terminal via the wireless communication unit 110 (S406).

On the other hand, if none of the characters in the handwritten input correspond to an impact pressure level, the controller 180 may generate pressure information, instead of impact information, regarding each of the characters in the handwritten input based on the pressure levels respectively corresponding to the characters in the handwritten input. More specifically, the controller 180 may set each of the pressure levels respectively corresponding to the characters in the handwritten input as the pressure information or may set an average of the pressure levels respectively corresponding to the characters in the handwritten input as the pressure information.

If the handwritten input includes, for example, a Korean syllable consisting of an initial consonant, a vowel and a final consonant, the controller 180 may set an average of the pressure levels respectively corresponding to the initial consonant, the vowel and the final consonant as pressure information. Alternatively, the controller 180 may set each of the pressure levels respectively corresponding to the initial consonant, the vowel and the final consonant as pressure information. In the latter case, the font sizes of the initial consonant, the vowel and the final consonant may be determined separately by their respective pressure information.

The controller 180 may set a sound effect for a character in the handwritten input corresponding to an impact pressure level by inserting an audio packet for outputting an alarm sound into a packet to be transmitted to the receiving mobile terminal or setting an audio file to be played in the receiving mobile terminal.

Figure 8:
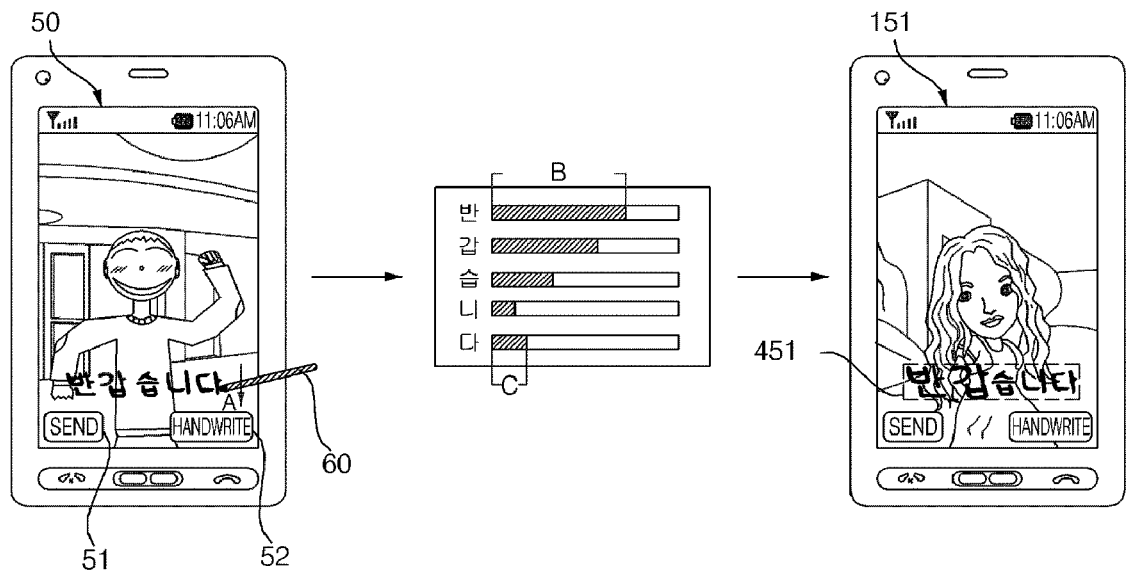
FIG. 8 illustrates diagrams for explaining how to transmit handwritten input and how to receive and display handwritten input.

FIG. 8 illustrates a diagram for explaining how to transmit handwritten input and how to receive and display handwritten input according to an exemplary embodiment of the present invention. Referring to FIG. 8, during a video call between the user of a transmitting mobile terminal and the user of a receiving mobile terminal, the user of the transmitting mobile terminal may select a 'HANDWRITE' menu 52 using a stylus pen 60, and may handwrite a text string including five Korean syllables on a touch screen 50 of the transmitting mobile terminal by applying different pressure levels onto the touch screen 50.

More specifically, the level of pressure applied for handwriting the first Korean syllable may be higher than the level of pressure applied for handwriting the fifth Korean syllable, as indicated by reference characters B and C. If the user of the transmitting mobile terminal selects a 'SEND' menu 51 while still engaging in the video call with the user of the receiving mobile terminal, the text string handwritten by the user of the transmitting mobile terminal may be sent to the receiving mobile terminal. Then, the text string handwritten by the user of the transmitting mobile terminal may be displayed on a touch screen 151 of the receiving mobile terminal, and particularly, in an area 451 on the touch screen 151 that does not interfere with the video call between the user of the transmitting mobile terminal and the user of the receiving mobile terminal.

Figure 9:
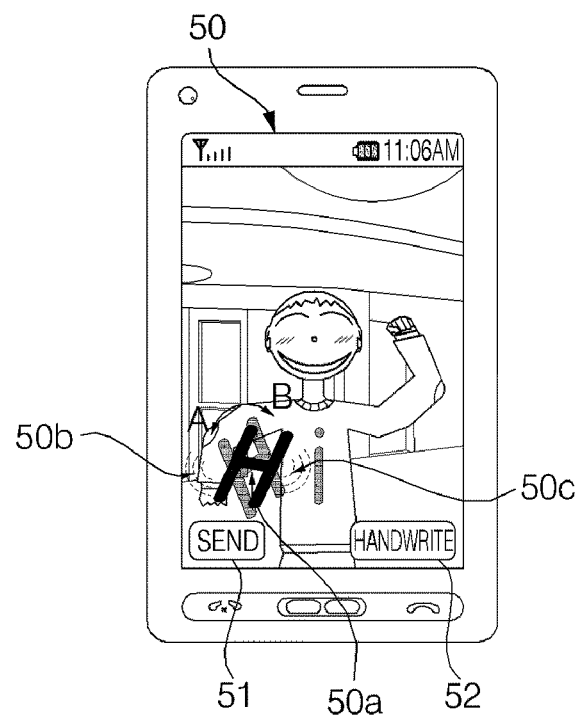
FIGS. 9 through 11 illustrate diagrams for explaining how to display handwritten input.
Figure 10:
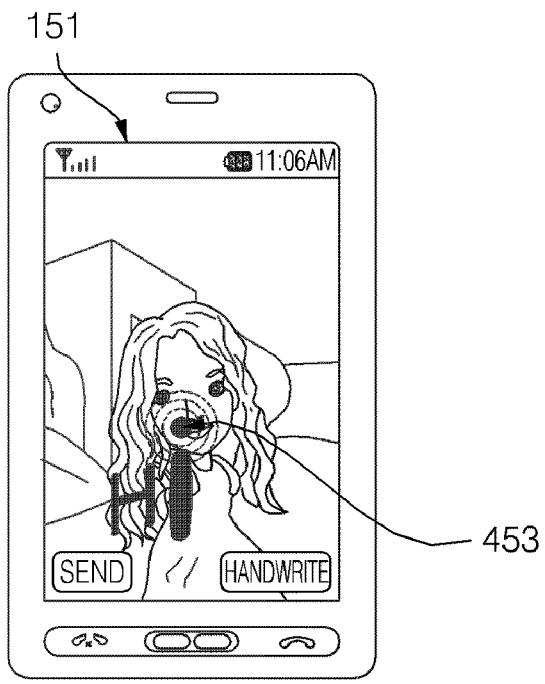
Figure 11:
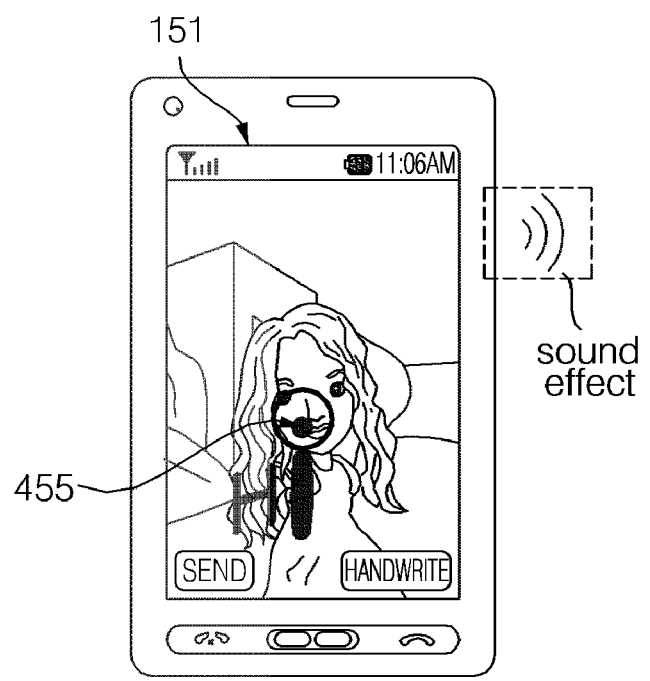

FIGS. 9 through 11 illustrate diagrams for explaining how to transmit handwritten input and how to receive and display handwritten input according to another exemplary embodiment of the present invention. Referring to FIG. 9, if handwritten input is received from a transmitting mobile terminal and there is a character in the handwritten input corresponding to a high pressure level, the controller 180 of the mobile terminal 100 may display the handwritten input on the touch screen 151 along with various haptic effects.

More specifically, if the handwritten input is, for example, 'Hi,' the controller 180 may determine whether a pressure level corresponding to each character in the handwritten input exceeds a predefined reference level. If the pressure level corresponding to the character 'H' in the handwritten input is determined to exceed the predefined reference level, the controller 180 may shake the character 'H' in the handwritten input at least once in a direction between point A and point B. The predefined reference level may be an average pressure level for handwriting characters on the touch screen 151, and may be determined by the manufacture of the mobile terminal 100.

The controller 180 may generate vibration at a position 50*b* when the character 'H' in the handwritten input is tilted toward point A, and may generate vibration at a position 50*c* when the character 'H' in the handwritten input is tilted toward point B.

Referring to FIG. 10, if the pressure level corresponding to the character 'i' in the handwritten input is high, the controller 180 may increase the font size of the character 'i' in the handwritten input, and may generate vibration at a position 453 where the character 'i' in the handwritten input is displayed.

Referring to FIG. 11, the controller 180 may apply a visual effect, a vibration effect and an audio effect at the same time to a character in handwritten input corresponding to a high pressure level.

More specifically, the controller 180 may generate vibration at the position 455, may emphasize the character 'i' in the handwritten input over the character 'H' in the handwritten input by increasing the font size of the character 'i' in the handwritten input, and may generate a sound whose volume is proportional to the pressure level corresponding to the character 'i' in the handwritten input.

The controller 180 may change the length, boldness or width of each of the characters 'H' and 'i' in the handwritten input based on the pressure levels respectively corresponding to the characters 'H' and 'i' in the handwritten input. In addition, the controller 180 may vary the intensity of vibration or the volume of a sound according to the pressure levels respectively corresponding to the characters 'H' and 'i' in the handwritten input.

The controller 180 may output a series of discrete sounds within a short period of time as a sound effect. For example, the controller 180 may output the sound of writing on the blackboard with a piece of chalk as a sound effect. As a result, the user of the mobile terminal 100 may feel as if the user of the transmitting mobile terminal is directly handwriting on the touch screen 151.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to carry the emotions or feelings of the user of one mobile terminal to the user of another mobile terminal by varying the font size of handwritten input or applying a haptic effect according to the level of pressure applied to a touch screen.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    receiving, via a controller of the mobile terminal, a packet including handwritten input and pressure information regarding the handwritten input;
    controlling a display unit of the mobile terminal, via the controller, to display the received handwritten input; and
    generating, via the controller, a haptic effect corresponding to the pressure information;
    wherein the haptic effect is generated while the display unit continuously displays the received handwritten input.

2. The method of claim 1, further comprising controlling the display unit, via the controller, to change at least a font size of the displayed handwritten input or a boldness of the displayed handwritten input based on the received pressure information.

3. The method of claim 1, wherein the haptic effect comprises vibration.

4. The method of claim 1, wherein the received pressure information comprises at least an average level of pressure applied for handwriting each character in the received handwritten input or levels of pressure applied for handwriting an initial consonant, a vowel and a final consonant of a syllable of the received handwritten input.

5. The method of claim 1, wherein receiving the packet comprises receiving the packet during a video call or in association with a short message service (SMS) message or a multimedia messaging service (MMS) message.

6. The method of claim 1, wherein controlling the display unit to display the received handwritten input comprises controlling the display unit, via the controller, to induce motion to the displayed handwritten input based on the received pressure information.

7. The method of claim 6, wherein the method further comprises:
    controlling an audio output module of the mobile terminal, via the controller, to output a sound effect while the display unit moves the displayed handwritten input.

8. A method of controlling a mobile terminal, the method comprising:
    receiving, via a controller of the mobile terminal, a packet including handwritten input, input time information specifying an amount of time taken to generate the handwritten input, and impact information specifying a time of application of a highest pressure level during the generation of the handwritten input;
    controlling a display unit of the mobile terminal, via the controller, to display the received handwritten input based on the received input time information; and
    generating, via the controller, a haptic effect based on the received impact information.

9. The method of claim 8, further comprising controlling an audio output module of the mobile terminal, via the controller, to output a sound based on the received impact information.

10. The method of claim 9, further comprising controlling the display unit, via the controller, to change at least a font size of the displayed handwritten input or a boldness of the displayed handwritten input based on the received impact information.

11. A method of controlling a mobile terminal, the method comprising:
    receiving input, via a touch screen of the mobile terminal, of at least one character handwritten on the touch screen;
    generating, via a controller of the mobile terminal, handwritten input based on the received input of the at least one character;
    generating a packet, via the controller, based on the handwritten input and pressure information specifying a level of pressure applied to the touch screen while receiving the input of the at least one character; and
    encoding the packet via the controller; and
    transmitting the encoded packet, via the controller, to a receiving mobile terminal.

12. The method of claim 11, wherein the packet is a haptic packet including the handwritten input, the pressure information, and at least video information, haptic information or audio information.

13. The method of claim 11, wherein the pressure information includes at least an average level of pressure applied to the touch screen when receiving the input of each character of the at least one character or levels of pressure applied to the touch screen when receiving input of an initial consonant, a vowel and a final consonant of a syllable formed by the received input of the at least one character.

14. A mobile terminal comprising:
    a wireless communication unit configured to provide a communication interface with a receiving mobile terminal;
    a touch screen configured to:
        recognize pressure applied thereto for generating handwritten input; and
        recognize the handwritten input; and a controller configured to:
  generate a first packet including the handwritten input and pressure information specifying a level of the pressure applied to the touch screen for generating the handwritten input; and
  transmit the first packet to the receiving mobile terminal via the wireless communication unit.

15. The mobile terminal of claim 14, wherein the pressure information includes at least an average level of pressure applied to the touch screen for handwriting each character in the generated handwritten input or levels of pressure applied to the touch screen for handwriting an initial consonant, a vowel and a final consonant of a syllable of the generated handwritten input.

16. The mobile terminal of claim 14, wherein the controller is further configured to:
  generate a second packet including the generated handwritten input, input time information specifying an amount of time taken to generate the handwritten input, and impact information specifying a time of application of a highest pressure level to the touch screen during the generation of the handwritten input; and
  transmit the second packet to the receiving mobile terminal via the wireless communication unit.

17. The mobile terminal of claim 16, wherein the controller is further configured to set audio information corresponding to the impact information in the generated second packet.

* * * * *